(12) United States Patent
Patel et al.

(10) Patent No.: US 8,033,113 B2
(45) Date of Patent: Oct. 11, 2011

(54) FUEL INJECTION SYSTEM FOR A GAS TURBINE ENGINE

(75) Inventors: Bhawan B. Patel, Mississauga (CA); Oleg Morenko, Oakville (CA); Nagaraja Rudrapatna, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1154 days.

(21) Appl. No.: 11/748,675

(22) Filed: May 15, 2007

(65) Prior Publication Data

US 2009/0126368 A1   May 21, 2009

Related U.S. Application Data

(63) Continuation-in-part of application No. 11/513,030, filed on Aug. 31, 2006.

(51) Int. Cl.
*F02C 1/00* (2006.01)
*F02G 3/00* (2006.01)

(52) U.S. Cl. .................. 60/742; 60/739; 60/740
(58) Field of Classification Search .......... 60/734, 60/739, 740, 742; 239/533.2
See application file for complete search history.

(56) References Cited

U.S. PATENT DOCUMENTS

| | | | |
|---|---|---|---|
| 1,081,950 A | 12/1913 | Eller | |
| 2,151,540 A | 3/1939 | Varga | |
| 2,443,373 A | 6/1948 | Borsoff | |
| 2,935,848 A * | 5/1960 | Billman | 60/741 |
| 2,946,185 A * | 7/1960 | Bayer | 60/762 |
| 3,213,523 A | 10/1965 | Boehler | |
| 3,472,025 A | 10/1969 | Simmons et al. | |
| 3,585,421 A | 6/1971 | Muench et al. | |
| 3,869,132 A | 3/1975 | Taylor et al. | |
| 4,100,733 A | 7/1978 | Striebel et al. | |
| 4,322,945 A | 4/1982 | Peterson et al. | |
| 4,327,547 A | 5/1982 | Hughes et al. | |
| 4,332,626 A | 6/1982 | Hood et al. | |
| 4,377,420 A | 3/1983 | Granatek et al. | |
| 4,404,806 A | 9/1983 | Bell, III et al. | |
| 4,472,133 A | 9/1984 | Petersen et al. | |
| 4,483,137 A | 11/1984 | Faulkner | |
| 4,703,888 A | 11/1987 | Kawamura et al. | |
| 4,870,943 A | 10/1989 | Bradley et al. | |
| 5,036,657 A | 8/1991 | Seto et al. | |
| 5,102,054 A | 4/1992 | Halvorsen | |
| 5,197,288 A * | 3/1993 | Newland et al. | 60/734 |

(Continued)

FOREIGN PATENT DOCUMENTS

CA        1013153        7/1977

(Continued)

OTHER PUBLICATIONS

U.S. Appl. No. 11/220,849, Prociw et al.

(Continued)

*Primary Examiner* — Louis Casaregola
*Assistant Examiner* — Andrew Nguyen
(74) *Attorney, Agent, or Firm* — Norton Rose OR LLP (57) ABSTRACT

A fuel injection system comprises a fuel conveying member and a nozzle tip assembly threadably engaged thereto. A pair of sealing elements is engaged in a fuel passage between the fuel conveying member and the nozzle tip for sealing the junction therebetween. The pair of sealing elements includes a first and a second sealing element located proximate each other and having different cross-sectional shape.

18 Claims, 4 Drawing Sheets

U.S. PATENT DOCUMENTS

| | | | |
|---|---|---|---|
| 5,253,471 A | 10/1993 | Richardson | |
| 5,271,219 A | 12/1993 | Richardson | |
| 5,396,759 A | 3/1995 | Richardson | |
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,630,319 A | 5/1997 | Schilling et al. | |
| 5,737,921 A | 4/1998 | Jones et al. | |
| 5,771,696 A | 6/1998 | Hansel et al. | |
| 5,797,266 A | 8/1998 | Brocard et al. | |
| 5,848,525 A | 12/1998 | Spencer | |
| 5,938,402 A | 8/1999 | Bochud et al. | |
| 5,944,483 A | 8/1999 | Beck et al. | |
| 5,956,955 A | 9/1999 | Schmid | |
| 5,983,642 A | 11/1999 | Parker et al. | |
| 5,996,335 A | 12/1999 | Ebel | |
| 6,101,814 A | 8/2000 | Hoke et al. | |
| 6,109,038 A | 8/2000 | Sharifi et al. | |
| 6,141,968 A | 11/2000 | Gates et al. | |
| 6,149,075 A | 11/2000 | Moertle et al. | |
| 6,240,732 B1 | 6/2001 | Allan | |
| 6,256,995 B1 | 7/2001 | Sampath et al. | |
| 6,463,739 B1 | 10/2002 | Mueller et al. | |
| 6,503,334 B2 | 1/2003 | Ruiz et al. | |
| 6,712,080 B1 | 3/2004 | Handschuh et al. | |
| 6,761,035 B1 | 7/2004 | Mueller | |
| 7,028,484 B2 * | 4/2006 | Prociw et al. | 60/772 |
| 2003/0014979 A1 | 1/2003 | Summerfield et al. | |
| 2005/0005610 A1 * | 1/2005 | Belsom et al. | 60/796 |
| 2005/0023770 A1 | 2/2005 | Swensen et al. | |
| 2005/0188699 A1 | 9/2005 | Shafique et al. | |
| 2006/0010873 A1 * | 1/2006 | Henriquez | 60/752 |
| 2006/0096291 A1 | 5/2006 | Hebert et al. | |
| 2006/0156731 A1 | 7/2006 | Prociw | |
| 2006/0156733 A1 | 7/2006 | Prociw et al. | |
| 2006/0218925 A1 | 10/2006 | Prociw et al. | |

FOREIGN PATENT DOCUMENTS

| | | |
|---|---|---|
| CA | 2307186 | 5/1999 |
| EP | 0660038 | 6/1995 |
| EP | 0939275 | 9/1999 |
| GB | 2404976 | 2/2005 |
| WO | WO 9504244 | 2/1995 |

OTHER PUBLICATIONS

U.S. Appl. No. 11/465,655, Morenko.
U.S. Appl. No. 11/489,533, Morenko.
U.S. Appl. No. 11/366,815, Olver.
U.S. Appl. No. 11/366,816, Fish.
U.S. Appl. No. 11/366,814, Patel et al.
U.S. Appl. No. 11/532,611, Rudrapatna et al.
U.S. Appl. No. 11/552,240, Patel.
U.S. Appl. No. 11/535,185, Morenko.
U.S. Appl. No. 11/534,381, Fish.
Non-Final of Action for U.S. Appl. No. 11/513,030 mailed Oct. 7, 2009.
Final Office Action for U.S. Appl. No. 11/513,030 mailed Apr. 28, 2010.
Advisory Office Action for U.S. Appl. No. 11/513,030 mailed Jun. 28, 2010.
Non-Final Office Action for U.S. Appl. No. 11/513,030 mailed Aug. 20, 2010.
Final Office Action for U.S. Appl. No. 11/513,030 mailed Mar. 10, 2011.

\* cited by examiner

FIG_2

FIG-3

FUEL INJECTION SYSTEM FOR A GAS TURBINE ENGINE

CROSS-REFERENCE TO RELATED APPLICATIONS

The is a continuation-in-part of U.S. patent application Ser. No. 11/513,030 filed Aug. 31, 2006, the entire contents of which are incorporated herein by reference.

TECHNICAL FIELD

The invention relates generally to a gas turbine engine and, more particularly, to an improved fuel injection system for a gas turbine engine.

BACKGROUND OF THE ART

A gas turbine engine may have an internal manifold with attached fuel nozzle tips. Often, a fastening/sealing method such as a brazing process is utilized in order to achieve a rigid joint between the fuel conveying member and the nozzle tips that does not introduce a leak during engine operation. In order to achieve a high quality brazing joint, precision machining of the mating components is required which is costly for the manufacturers. Furthermore, the use of an expensive brazing paste is necessary to carry out the brazing process. Due to a very small parts size, particularly in smaller gas turbine engines, the assembly operation is time consuming and requires a highly skilled technician to do the work. Once a nozzle tip is assembled, it is very difficult and often not at all possible to overhaul the nozzle tip or fuel conveying member if necessary. Consequently, one damaged nozzle tip could be a reason to scrap the nozzle or entire internal manifold.

Accordingly, there is a need to provide an improved fuel injection system.

SUMMARY OF THE INVENTION

It is therefore an object of this invention to provide an improved fuel injection system for a gas turbine engine.

In accordance with one aspect of the present invention, there is provided a fuel injection system for a gas turbine engine comprising a fuel conveying member and a nozzle tip threadably engaged thereto, the fuel conveying member and the nozzle tip defining at least one fuel passage therebetween, and at least one pair of sealing elements engaged between the fuel conveying member and the nozzle tip to seal said at least a first fuel passage, each of said at least one pair of sealing elements including a first and a second sealing element disposed proximate each other, the first and second sealing elements having different cross-sectional shapes.

There is also provided, in accordance with another aspect of the present invention, a fuel injection system for a gas turbine engine comprising: a manifold ring adapted for installation inside a gas turbine engine and having a plurality of circumferentially distributed nozzle tip receiving sites, the manifold ring including at least one fuel transporting conduit defined therein in communication with each of the nozzle tip receiving sites; a plurality of nozzle tip assemblies mounted about the manifold ring, each nozzle tip assembly being threadedly engaged in one of said nozzle tip receiving sites and disposed in fluid communication with the fuel transporting conduit; at least a first fuel passage defined between the manifold ring and each nozzle tip assembly; and at least one pair of sealing elements compressively engaged in the first fuel passage between a first compression surface defined by the manifold ring and a second compression surface defined by the nozzle tip assembly for sealing a first junction therebetween, the pair of sealing elements including an annular C-shaped seal and an annular O-ring seal, concentric and axially offset from each other.

There is further provided, in accordance with another aspect of the present invention, a fuel injection system comprising a fuel conveying member defining a nozzle receiving cavity having an axis, said nozzle receiving cavity first and second axially spaced-apart annular shoulders, a nozzle tip threadably engaged in said nozzle receiving cavity, said nozzle tip having third and fourth annular shoulders in opposed facing relationship with said first and second annular shoulders, respectively, and a first and a second pair of sealing elements respectively axially compressed between said first and third annular shoulders and said second and fourth annular shoulders, each of said first and second pairs of sealing elements including a radially inwardly disposed C-shaped seal and a radially outwardly disposed O-ring seal proximate each other, the C-shaped seal and the O-ring seal being concentric with each other and axially offset.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
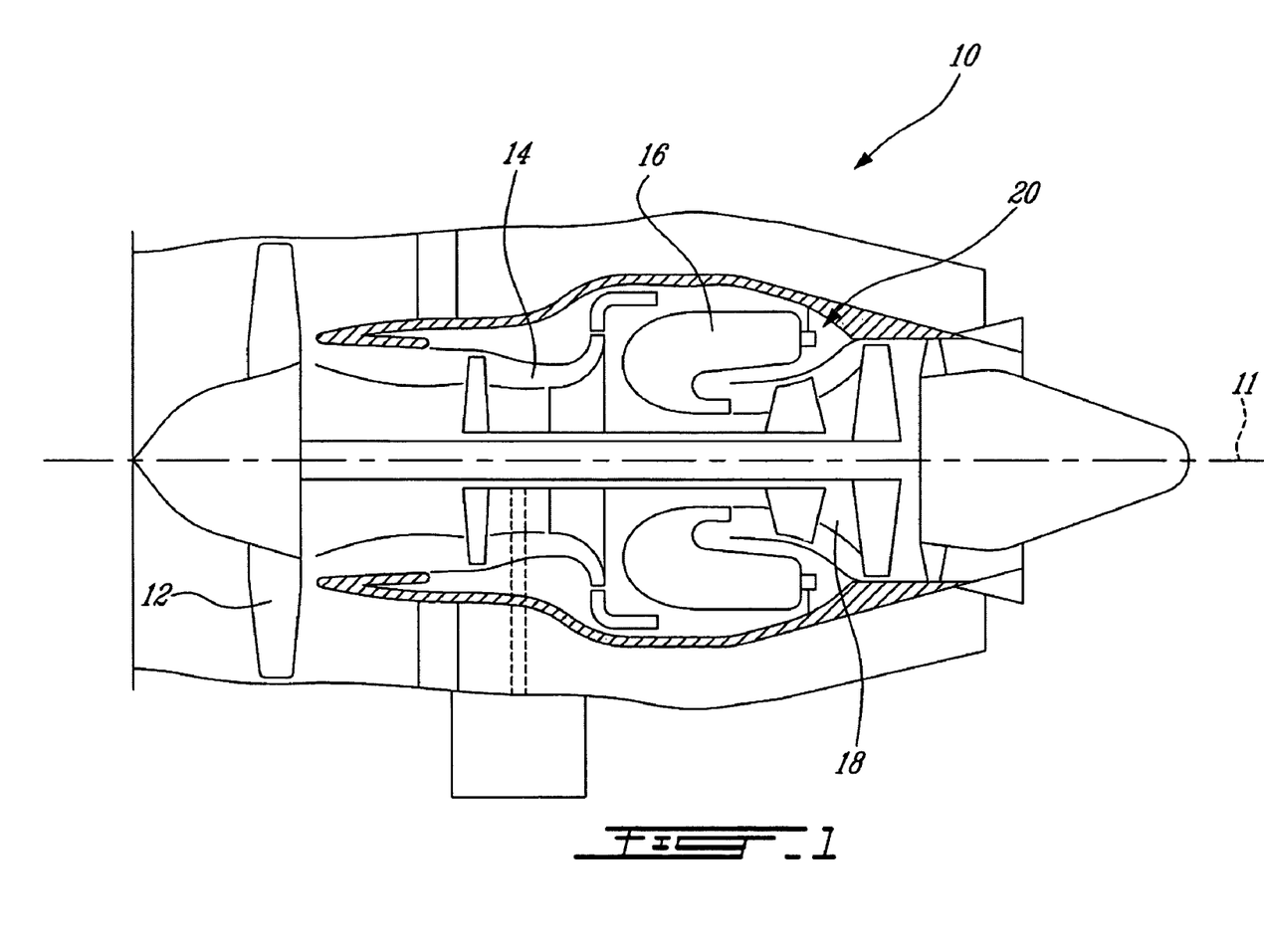
FIG. 1 is a cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2:
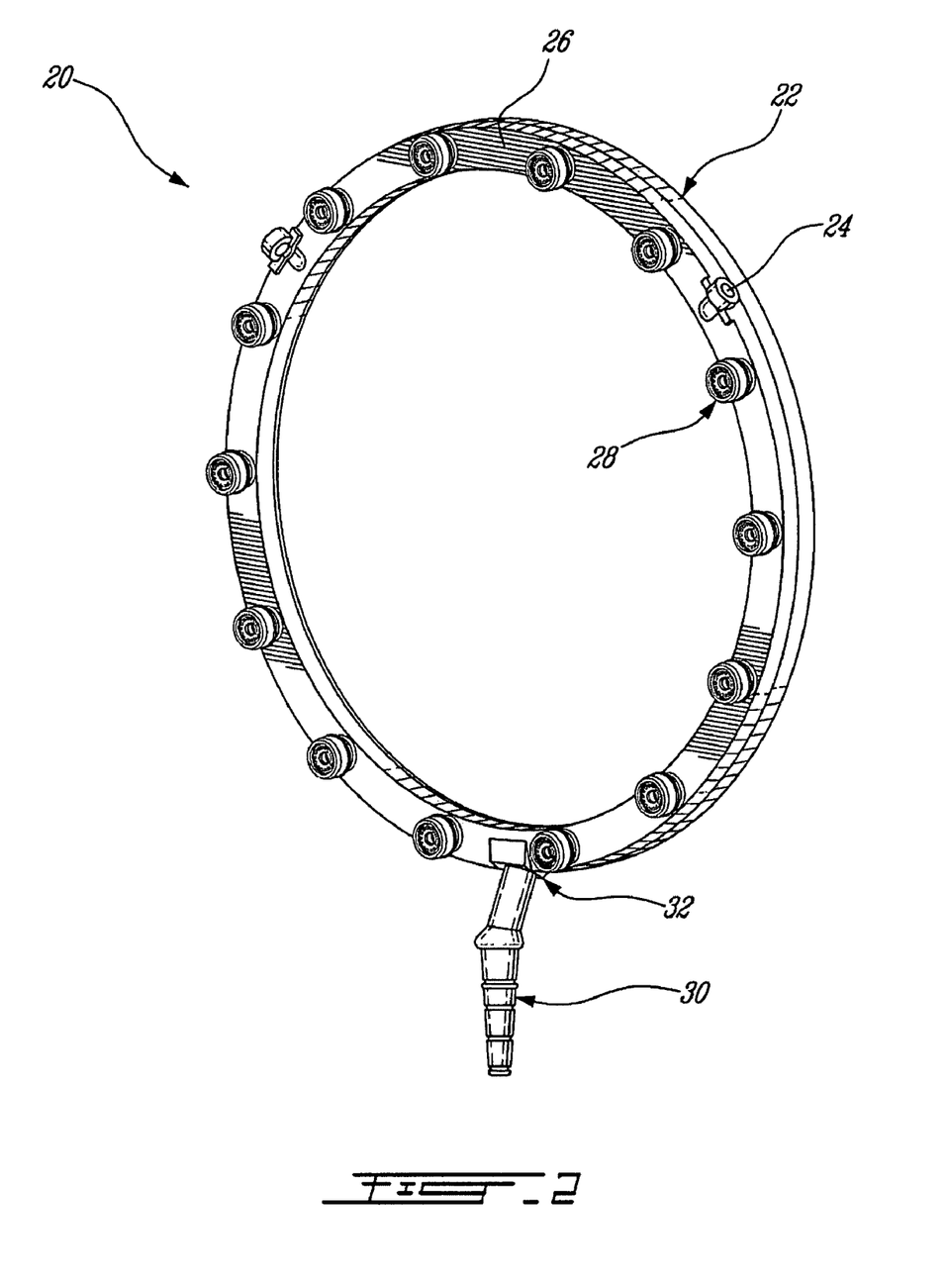
FIG. 2 is a perspective view of a portion of the fuel injection system for a gas turbine engine such as that shown in FIG. 1, including a fuel manifold ring with circumferentially distributed fuel nozzle tip assemblies.

Referring to FIG. 2, the fuel injection system 20 comprises at least one fuel conveying member through which fuel flows. In the exemplary embodiment, the fuel injection system 20 includes an annular fuel manifold ring 22 which is mounted adjacent to the combustor 16 in the gas turbine engine 10. The fuel manifold ring 22 is preferably mounted to the combustor 16 or to surrounding support structure via several integral attachment lugs 24. The exterior of the manifold ring 22 may include an outer heat shield 26 covering the ring. This provides the fuel manifold ring 22 thermal protection from the high temperature environment of the combustor 16.

A plurality of fuel injecting nozzle tip assemblies 28 are provided about the circumference of the fuel manifold ring 22. The nozzle tip assemblies 28 atomize the fuel as it is injected into the combustor 16 for ignition when mixed with the compressed air therein. Fuel enters the annular fuel manifold ring 22 through a fuel inlet pipe 30, via inlet 32, and is distributed within the manifold ring 22 such that fuel flow is provided to each of the fuel nozzle tip assemblies 28. Notably, the manifold ring 22 includes at least one fuel transporting conduit defined therein (not shown).

Figure 3:
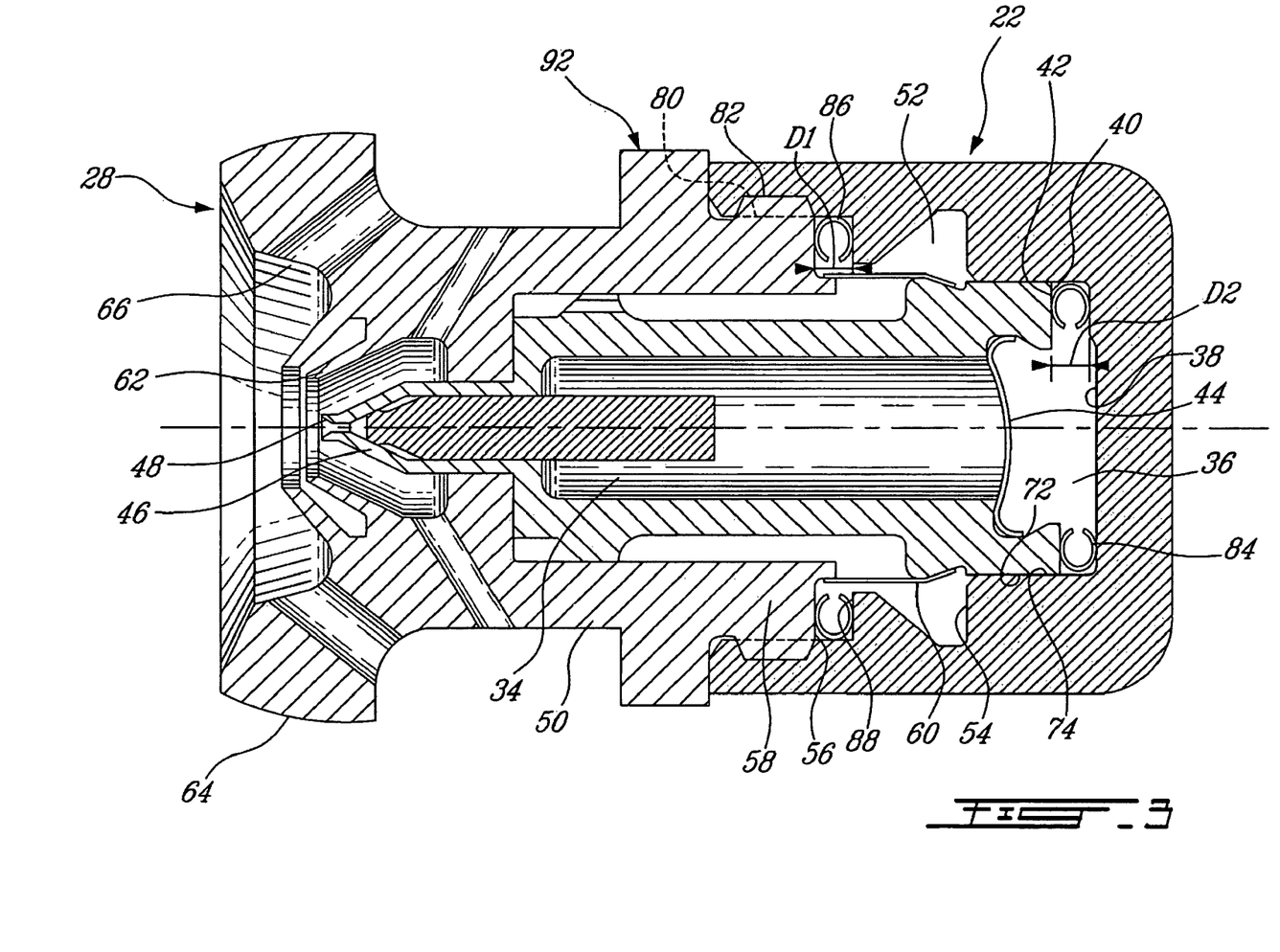
FIG. 3 is a cross-sectional view of the manifold ring and nozzle tip assembly of FIG. 2 in accordance with a first embodiment of the present invention.

Referring to FIG. 3, the interior construction of a fuel manifold ring 22 and a fuel nozzle tip assembly 28 in accordance with one embodiment of the fuel injection system 20 is depicted. Particularly, the fuel nozzle assembly 28 projects axially (relative to the central longitudinal axis 11 of the gas turbine engine 10) outwardly from fuel manifold ring 22, and includes a primary distributor 34 for regulating a primary fuel flow provided by the manifold ring 22. A primary fuel passage 36 is defined between the primary distributor 34 and a first inside wall 38 of the manifold ring 22. More specifically, a substantially flat radial face 40 (i.e. perpendicular to the central longitudinal axis 11) of one end 42 of the primary distributor 34 is adapted to abut and compress a C-shaped seal 84 against the first inside wall 38 following assembly to provide a seal in the primary fuel flow passage 36 between the primary distributor 34 and the manifold ring 22, as will be explained in more details herein-below. Thus, a primary fuel flow is communicated from the manifold ring 22 into the primary fuel passage 36, which then flows through a perforated primary screen 44 supported by the primary distributor 34. The primary distributor 34 comprises a primary cone 46 adapted to eject the fuel through a primary fuel nozzle tip 48.

Typically, the fuel nozzle tip assembly 28 also comprises a secondary fuel swirler 50 disposed substantially concentrically about the primary distributor 34. A secondary fuel passage 52 is defined between the secondary fuel swirler 50 and a second inside wall 54 of the manifold ring 22. More specifically, the secondary fuel passage 52 is defined by the spaced relationship between a substantially flat radial face 56 (i.e. perpendicular to the central longitudinal axis 11) of one end 58 of the secondary fuel swirler 50 and the second inside wall 54. Thus, a secondary fuel flow is communicated from the manifold ring 22 into the secondary fuel passage 52, which then flows through a perforated secondary screen 60 supported by both the primary distributor 34 and the secondary fuel swirler 50. The secondary fuel swirler 50 is adapted to swirl the secondary fuel flow before it is ejected through an annular secondary fuel nozzle tip 62.

The fuel nozzle tip assembly 28 also typically comprises an outer air swirler 64 including a plurality of circumferentially spaced air passages 66 which convey air flow for blending with the primary and secondary fuel sprays issuing from the primary and secondary nozzle tips or spray orifices, 48 and 62 respectively, of the fuel nozzle tip assembly 28.

The fuel injection system 20 comprises an improved fuel conveying member and a nozzle tip assembly engagement. Particularly, the fuel conveying member, which is exemplified as a manifold ring 22, is threadedly engaged with each of the fuel nozzle tip assemblies 28. As can be seen in FIG. 3, the fuel manifold ring 22 has an annular threaded portion 80. Thus, the nozzle tip assembly 28 has a corresponding threaded portion 82 for threaded engagement with annular threaded portion 80 of the manifold ring 22. The threaded portion 82 is provided on an outer surface of the secondary fuel swirler 50. The mating threaded portions 80 and 82 act to fix the fuel nozzle tip assembly 28 to the manifold ring 22.

By providing a threaded design for the engagement between the fuel nozzle tip assemblies 28 and the manifold ring 22, a need exists to ensure that leakage does not occur through the threaded connection due to a difference in the thermal growth between the mating parts. Thus, in the embodiment of FIG. 3, the fuel injection system 20 comprises sealing elements 84 and 86, in this case C-seals, that replace the seals created by the conventional brazing joints.

Still referring to FIG. 3, it can be seen that the sealing elements 84 and 86 are provided in the primary and secondary fuel passages 36 and 52 respectively. The sealing elements 84 and 86 are preferably provided in the form of annular "C"-shaped seals made from a thin nickel based material adapted to sustain a predetermined amount of compression. C-seals made from nickel based material are adapted to sustain temperatures up to 1200° F. The sealing elements 84 and 86 could also be made out of other high temperature resistant materials. Also, a "W" shape or other compressible shape could be used. A "C" shape is preferable due to the small size of the seal. The sealing elements 84 and 86 act to seal the primary and secondary fuel passages 36 and 52 from leakage occurring through the junction between the nozzle tip assembly 28 and the manifold ring 22. More specifically, sealing element 86 is positioned adjacent threaded portions 80 and 82 in the secondary fuel passage 52.

The manifold ring 22 comprises an abutting member 88 projecting annularly inward (ie. perpendicular to the central longitudinal axis 11) in the secondary fuel passage 52 for enabling compressing of the sealing element 84. The abutting member 88 is adapted to be spaced from the substantially flat face 56 of end 58 of the secondary fuel swirler 50 a predetermined distance D1. The distance D1 is a tightly controlled clearance determined by factors such as engine size. The abutting member 88 is also preferably configured to take up as little space as possible in the secondary fuel passage 52 while maintaining the structural integrity of the manifold ring 22 when in compression.

As shown in FIG. 3, the sealing element 86 is compressed between the abutting member 88 and the substantially flat face 56 such that it is compressed in a direction parallel to the central longitudinal axis 11 of the engine 10. In greater detail, the compressive axial force causes the free ends of the "C" sealing element 86 to move closer together. Notably, sealing element 86 is not shown fully compressed. In such a case, the top curved portion of the "C" sealing element 86 would abut the manifold ring 22. Thus, pressing the sealing member 86 against two surfaces impedes fuel leakage from occurring out of the secondary fuel passage 52 via the threaded engagement.

Still referring to FIG. 3, it can be seen that sealing element 84 is compressed between the first inside wall 38 of the manifold ring 22 and flat face 40 of end 42 of the primary distributor 34 in the primary fuel passage 36. In this exemplary embodiment the axial length of the primary distributor 34 has been shortened so as to space the end face 40 from the first inside wall 38 such that a distance D2 is defined therebetween. The distance D2 is also a tightly controlled clearance determined by factors such as engine size. The "C" sealing element 84 is compressed in a direction parallel to the central longitudinal axis 11 of the engine 10 and reacts as described above for sealing element 86. Notably, sealing element 84 is not shown fully compressed. In such a case, the top curved portion of the "C" sealing element 84 would abut the manifold ring 22 at an exterior diameter of the primary fuel passage 36 and prevent fuel from leaking out thereof through joint 90 of the mating members. It can be seen from FIG. 3 that joint 90 is created when annular outer surface 72 of the primary distributor 34 comes into contact with the first inside annular surface 74 of the manifold ring 22 extending substantially axially between the primary and secondary fuel passages 36 and 52. Thus, sealing element 84 prevents fuel from the primary fuel passage 36 from leaking into the secondary fuel passage 52.

Notably, in the present particular embodiment, the manifold ring 22 does not need to be modified to accommodate sealing element 84 in the primary fuel passage 36 as is the case with abutting member 88 for sealing member 86.

As described above, the improved fuel injection system 20 provides a simplified design for facilitating engagement of the fuel nozzle tip assemblies 28 to the fuel manifold ring 22. To assemble a fuel nozzle tip assembly 28 to the manifold ring 22, one must properly position the sealing elements 84 and 86 in the manifold ring 22 and subsequently thread the nozzle tip assembly 28 thereto via a nut and bolt type connection generally identified by reference numeral 92 in FIG. 3. The action of threading the parts together can be carried out quickly when compared to the brazing process of the prior art. As the parts are tightly threaded together, axial compressive forces are against the sealing elements 84 and 86.

Furthermore, by facilitating the assembly of the fuel nozzle tip assemblies 28 on the manifold ring 22 through a threaded design, the fuel nozzle tip assemblies 28 or the manifold ring 22 can be easily replaced. The above described configuration simplifies overall design and reduces cost. For example, if only a single fuel nozzle tip assembly 28 of the entire fuel injection system 20 is damaged, it can easily be unthreaded and replaced. Notably, the "C" sealing elements are not expensive and are easy to install.

Figure 4:
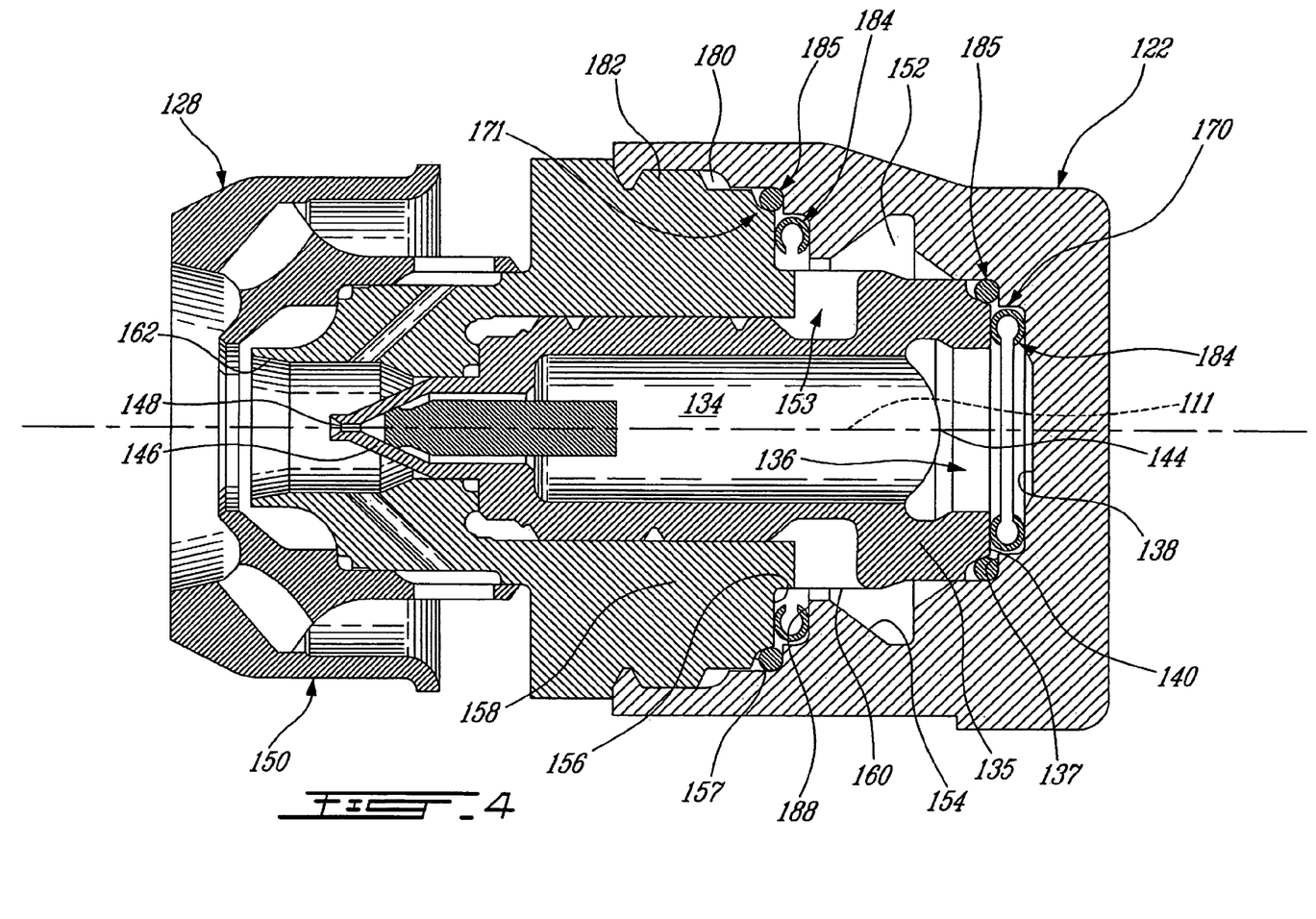
FIG. 4 is a cross-sectional view of the manifold ring and nozzle tip assembly of FIG. 2 in accordance with a second embodiment of the present invention.

Referring now to FIG. 4, a fuel manifold ring 122 and a fuel nozzle tip assembly 128 of an alternate embodiment of the present fuel injection system are depicted. The fuel nozzle tip assembly 128 is similar to the fuel nozzle assembly 28 described above, however includes a slightly different sealing configuration as will be described in further detail below.

Generally, the fuel nozzle assembly 128 projects axially, relative to the central longitudinal axis 11 of the gas turbine engine 10, outwardly from fuel manifold ring 122, and includes a primary distributor 134 for regulating a primary fuel flow provided by the manifold ring 122. A primary fuel passage 136 is defined between the primary distributor 134 and a first inside wall 138 of the manifold ring 122. Thus, a primary fuel flow is communicated from the manifold ring 122 into the primary fuel passage 136, which is at least partially defined between the manifold ring 122 and the fuel nozzle assembly 128. The fuel within the primary fuel passage 136 then flows through a perforated primary screen 144 supported by the primary distributor 134. The primary distributor 134 comprises a primary cone 146 adapted to eject the fuel through a primary fuel nozzle tip 148. The fuel nozzle tip assembly 128 also comprises a secondary fuel swirler 150 disposed substantially concentrically about the primary distributor 134 and adapted to swirl the secondary fuel flow before it is ejected through an annular secondary fuel nozzle tip 162. A secondary fuel passage 152 is defined between the secondary fuel swirler 150 and a second inside wall 154 of the manifold ring 122. Thus, a secondary fuel flow is communicated from the manifold ring 122 into the secondary fuel passage 152, which then flows through a perforated secondary screen 160 supported by both the primary distributor 134 and the secondary fuel swirler 150 into that portion 153 of the secondary fuel passage defined within the body of the primary distributor of the nozzle tip 128.

Each of the fuel nozzle tip assemblies 128 is threadably engaged with the manifold ring 122. The fuel manifold ring 122 has an internal threaded portion 180 within which a corresponding thread 182 defined on the outer surface of the body of the nozzle tip assembly 128 threadably engages. The threaded portion 182 may also be provided on an outer surface of the secondary fuel swirler 150. The mating threaded portions 180 and 182 act to fix the fuel nozzle tip assembly 128 to the manifold ring 122.

In order to ensure a good seal between the threaded fuel nozzle tip assemblies 128 and the manifold 122, a number of sealing elements are provided. In the embodiment of FIG. 4, at least one pair 170 of sealing elements are provided in order to form the seal between the fuel nozzle tip assemblies 128 and the manifold ring 122. Each of these pairs 170 of sealing elements includes a first sealing element 184 and a second sealing element 185 located proximate each other. Thus, these pairs of seals 170 act together to seal a fuel flow passage at least partially defined between the fuel nozzle tip assembly 128 and the manifold ring 122. In at least one embodiment, such as that depicted in FIG. 4, the first sealing element 184 is an annular "C"-shaped seal (i.e. having a cross-sectional profile that is substantially C-shaped) and the second sealing element 185 is an "O"-ring seal. Although other materials may be used, in one embodiment the C-shaped is made from a thin nickel based material adapted to sustain a predetermined amount of compression, while the O-ring seal may be made of a relatively soft metal wire, whether the same nickel based material as the C-seal or another suitable material.

In the embodiment of FIG. 4, the first, or C-shaped, sealing element 184 of each pair 170 is located radially inwardly from the second, or O-ring, sealing element 185 relative to a central axis 111 of the nozzle tip 128. Thus, the first, C-shaped, sealing element 184 provides the primary, or main, seal of the fuel passage while the second, O-ring, sealing element 185 acts as a back-up in the event that the sealing capability of the primary C-shaped sealing element 184 should deteriorate. This can occur, for example, due to creep and/or wear which may happen over time. While the natural (i.e. uncompressed) cross-sectional shape of the O-ring sealing element 185 may be round, once slightly compressed when the nozzle tip assembly 128 is screwed into place within the opening of the manifold ring 122, the relatively soft wire O-ring will tend to slightly deform. Over time, micro cavities will develop around this deformed O-ring shape. However, may provide an advantageous sealing effect in the event of a deterioration or failure of the main C-shaped sealing element 184. Particularly, fuel which has seeped past the first primary C-shaped seal 184 will develop varnish and carbonize within these micro cavities around the O-ring seal 185 with time. This carbon build up within the micro cavities about the O-ring sealing element 185 will actually help to seal the fuel leakage.

As seen in FIG. 4, when two fuel passages 136 and 152 are defined between the fuel nozzle 128 and the manifold ring 122, two pairs 170 and 171 of sealing elements are also provided, respectively sealing the primary and secondary fuel passages 136 and 152. In the depicted embodiment, each pair of sealing elements 170, 171 is actually located within the respective fuel passages themselves at the joint between the fuel nozzle assembly 128 and the manifold ring 122. Thus, the first pair of sealing elements 170, which seal the primary fuel passage 136, are defined between an end surface 140 of the nozzle body 135 and a substantially parallel inside wall 138 of the manifold ring 122. Each of the first and second sealing elements 184 and 185 are annular and concentric with each other, however are slightly axially (i.e. relative to the main engine axis 11) offset from each other. In the embodiment of FIG. 4, for example, the first, C-shaped, sealing element 184 of the pair of sealing elements which seal the primary fuel passage 136 is located against the inside wall 138 of the manifold itself, while the second, O-ring, sealing element 185 of the same pair is abutted against a slight step or flange 137 formed in the base of the opening of the manifold ring 122 axially offset, in a direction outwards towards the exit of the spray tip nozzles. The same is true of the second pair 171 of sealing elements, which is disposed within, and acts to seal, the secondary fuel passage 152. Thus, the first, annular C-shaped, seal 184 of the second pair 171 of sealing elements is axially offset from the adjacent annular second, O-ring, seal 185 of the pair, being disposed slightly downstream or outwards (towards the exit of the spray tip nozzle) relative to the C-shaped seal. More specifically, the C-shaped seal 184 of the second pair 171 is abutted and compressed between a radial surface 156 of the nozzle (in this case a portion of the body 158 of the secondary fuel swirler 150) and an opposed, and substantially parallel, surface 188 of the manifold ring 122. The adjacent second O-ring seal 185 of the second pair 171 is axially forward from the C-ring seal 185, disposed and compressed between substantially parallel faces of a flange 157 defined in the fuel swirler body 158 and an opposed flange 159 in the manifold ring 122 which is axially offset from the surface 188 thereof.

Thus, each of the pairs 170 and 171 of sealing elements, each one comprising a first sealing element and a second sealing element, acts to provide a more secure double-seal for the fuel passages 136 and 152 defined between the threadably engaged fuel nozzle tip assemblies 128 and the fuel manifold ring 122. The improved sealing provided by these pairs of sealing elements permit the fuel injection assembly to be back-flushed if necessary during repair and maintenance of the fuel system, while limiting the possibility of undesirable fuel leaks from the threaded engagement between the fuel nozzles 128 and the fuel manifold 122.

For installation of the threaded fuel nozzle tip assemblies 128, each of the pairs 170,171 of seals may be either first positioned on the fuel nozzle before it is screwed into place within the manifold, or alternately may be suitably positioned within their respectively groves or flanges within the opening defined within the manifold which will threadably receive the fuel nozzle therein.

The above description is meant to be exemplary only, and one skilled in the art will recognize that changes may be made to the embodiments described without department from the scope of the invention disclosed. For example, the fuel conveying member is exemplified as an annular fuel manifold ring on which the nozzle tip assemblies are directly mounted; however, the fuel conveying member can also be provided as nozzle stems which are traditionally required to link, in fluid flow communication, the nozzle tip assemblies with each distinct fuel manifold for each fuel inlet source. Furthermore, the fuel injection system may comprise only a single fuel passage defined between the fuel conveying member and the nozzle tip assembly. Still other modifications which fall within the scope of the present invention will be apparent to those skilled in the art, in light of a review of this disclosure, and such modifications are intended to fall within the appended claims.

What is claimed is:

1. A fuel injection system for a gas turbine engine comprising a fuel conveying member and a nozzle tip threadably engaged thereto, the fuel conveying member and the nozzle tip defining at least one fuel passage therebetween, and at least one pair of sealing elements engaged between the fuel conveying member and the nozzle tip to seal a first one fuel passage of said at least one fuel passage, each of said at least one pair of sealing elements including a first and a second sealing element disposed proximate each other and directly abutted between the fuel conveying member and the nozzle tip, the first and second sealing elements having different cross-sectional shapes, and the first and second sealing elements being axially compressed between the fuel conveying member and the nozzle tip.

2. The fuel injection system as defined in claim 1, wherein the first sealing element is a C-shaped seal and the second sealing element is an O-ring seal.

3. The fuel injection system as defined in claim 2, wherein the first and second sealing elements are annular and concentric with each other.

4. The fuel injection system as defined in claim 3, wherein the first and second sealing elements are axially offset relative to each other.

5. The fuel injection system as defined in claim 2, wherein said C-shaped seal is disposed radially inwardly from said O-ring seal relative to a central axis of said nozzle tip.

6. The fuel injection system as defined in claim 1, wherein the first and second sealing elements are axially offset relative to each other.

7. The fuel injection system as defined in claim 1, wherein said pair of sealing elements is disposed within said first fuel passage.

8. The fuel injection system as defined in claim 1, wherein said first fuel passage and a secondary fuel passage are defined between the fuel conveying member and the nozzle tip, and two pairs of said sealing elements are disposed therebetween for respectively sealing each of the first and secondary fuel passages.

9. The fuel injection system as defined in claim 1, wherein each of the first sealing elements are abutted between first opposed surfaces of the fuel conveying member and the nozzle tip, and each of the second sealing elements are abutted between second opposed surfaces of the fuel conveying member and the nozzle tip, the first and second surfaces being axially offset from each other.

10. The fuel injection system as defined in claim 9, wherein the first and second opposed surfaces are respectively substantially parallel to each other.

11. The fuel injection system as defined in claim 1, wherein the fuel conveying member is a manifold ring and the fuel injection system comprises a plurality of said nozzle tips circumferentially distributed about the manifold ring and threadably engaged therein.

12. The fuel injection system as defined in claim 8, wherein the fuel conveying member defines a nozzle tip receiving cavity having a central nozzle axis, said fuel conveying member having first and second axially spaced-apart annular shoulders provided in said nozzle tip receiving cavity, said nozzle tip having corresponding third and fourth axially spaced-apart annular shoulders, a first of said two pairs of sealing elements being axially compressed between said first annular shoulder of said fuel conveying member and the opposed third annular shoulder of the nozzle tip, and a second of said two pairs of sealing elements being axially compressed between said second annular shoulder of said fuel conveying member and the opposed fourth annular shoulder of the nozzle tip.

13. The fuel injection system as defined in claim 12, wherein all of said shoulders are located upstream of a threaded connection between the nozzle tip and the fuel conveying member relative to a fuel flow through the nozzle tip.

14. A fuel injection system for a gas turbine engine comprising:
- a manifold ring adapted for installation inside a gas turbine engine and having a plurality of circumferentially distributed nozzle tip receiving sites, the manifold ring including at least one fuel transporting conduit defined therein in communication with each of the nozzle tip receiving sites;
- a plurality of nozzle tip assemblies mounted about the manifold ring, each nozzle tip assembly being threadedly engaged in one of said nozzle tip receiving sites and disposed in fluid communication with the fuel transporting conduit;
- at least a first fuel passage defined between the manifold ring and each nozzle tip assembly; and
- at least one pair of sealing elements compressively engaged in the first fuel passage in direct abutment between a first compression surface of the manifold ring and a second compression surface of the nozzle tip assembly for sealing a first junction therebetween, the pair of sealing elements including an annular C-shaped seal and an annular O-ring seal, concentric and axially offset from each other, each of the pair of sealing elements being axially compressed between the fuel conveying member and the nozzle tip.

15. The fuel injection system as defined in claim 14, wherein the first junction is defined between the engagement of an internal threaded portion of the nozzle tip receiving site and an outer threaded portion of the nozzle tip assembly, said at least one pair of sealing element being located upstream of said first junction relative to a fuel flow through the nozzle tip.

16. The fuel injection system as defined in claim 14, wherein said C-shaped seal is disposed radially inwardly from said O-ring seal relative to a central axis of said nozzle tip.

17. The fuel injection system as defined in claim 14, wherein a second fuel passage is defined between the manifold ring and each said nozzle tip, a second pair of said sealing elements being defined within said second fuel passage and providing sealing between the manifold ring and the nozzle tip.

18. A fuel injection system comprising a fuel conveying member defining a nozzle receiving cavity having an axis, said nozzle receiving cavity first and second axially spaced-apart annular shoulders, a nozzle tip threadably engaged in said nozzle receiving cavity, said nozzle tip having third and fourth annular shoulders in opposed facing relationship with said first and second annular shoulders, respectively, and a first and a second pair of sealing elements respectively axially compressed between said first and third annular shoulders and said second and fourth annular shoulders, each of said first and second pairs of sealing elements including a radially inwardly disposed C-shaped seal and a radially outwardly disposed O-ring seal proximate each other, the C-shaped seal and the O-ring seal being concentric with each other and axially offset.

* * * * *